Dec. 6, 1966   J. M. LAFFERTY   3,290,542
TRIGGERED VACUUM DISCHARGE DEVICE
Filed July 26, 1963   2 Sheets-Sheet 1

Inventor:
James M. Lafferty,
by John F. Ahern
His Attorney.

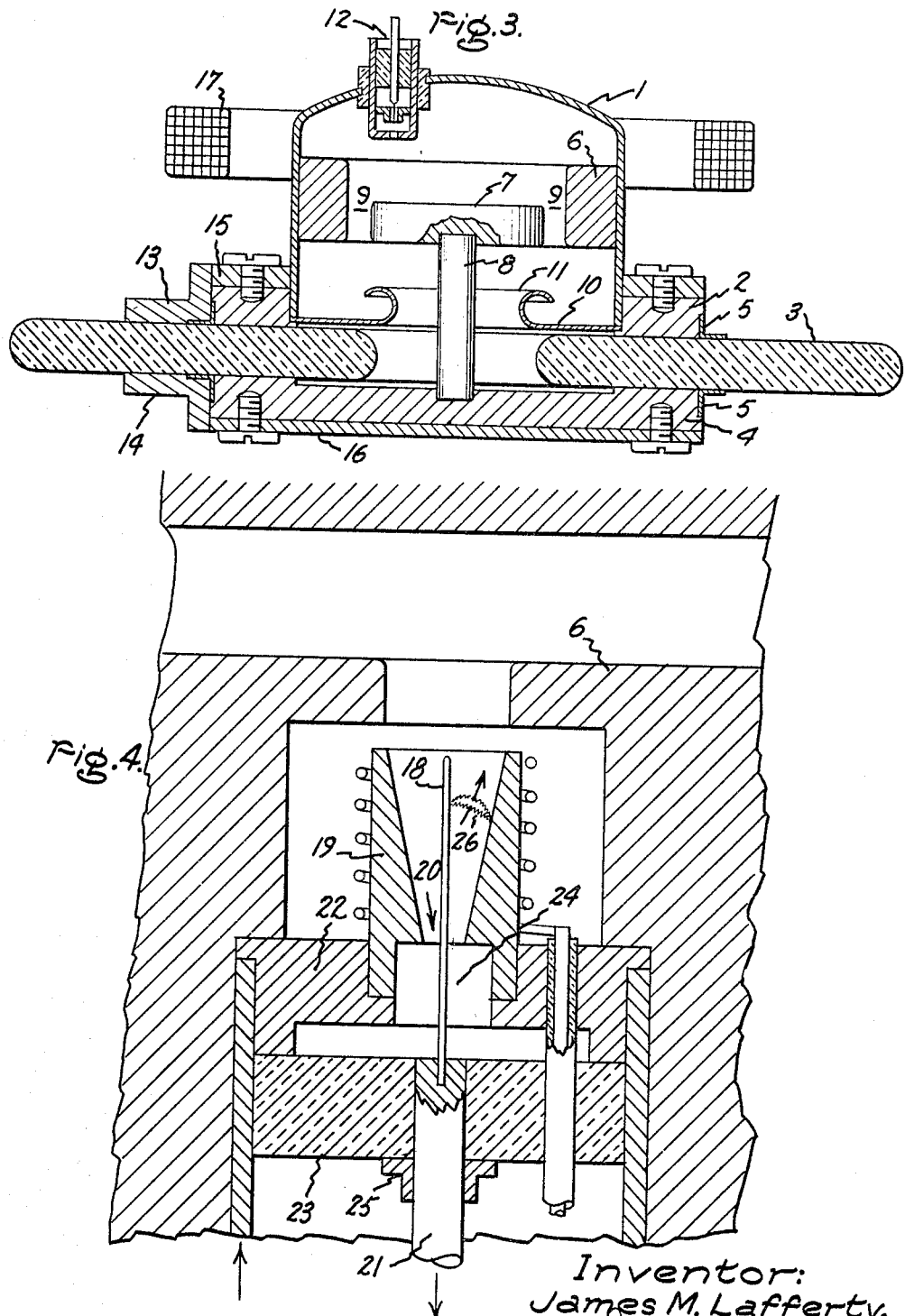

UnitedStates Patent Office 3,290,542
Patented Dec. 6, 1966

3,290,542
TRIGGERED VACUUM DISCHARGE DEVICE
James M. Lafferty, Schenectady, N.Y., assignor to General Electric Company, a corporation of New York
Filed July 26, 1963, Ser. No. 297,925
5 Claims. (Cl. 313—178)

The present invention relates to electric discharge devices adapted to switch high voltages and currents by triggering electric breakdown between a pair of fixed electrodes separated by a gap in vacuo and more particularly relates to an improved high speed, high current adaptation thereof.

Gap switching devices are devices normally maintained in an open circuit condition which, when subjected to an appropriate pulse or signal, are switched to a closed circuit condition and pass electric current therethrough. Such devices are used to great advantage as overload protectors, lightning arrestors and for the precision switching of extremely high voltages and currents, as for example, in discharging capacitor banks to obtain a very short pulse of extremely high current.

For these uses, gap discharge devices must be able to withstand high voltages and to break down or fire only when desired. They must be, for many applications, adapted to repeatedly fire, often thousands of times, in response to essentially the same breakdown conditions, with the same firing time. In other applications, as for example when used as lightning arresters, it is imperative that such gap devices have an extremely short recovery time so as to be ready to function again a short time after firing.

Most prior art gap discharge devices are charged with a gaseous atmosphere, often at super-atmospheric pressure. Although suitable for many applications, gaseous gap discharge devices usually have long recovery times, due to the necessity of ionized gases therein becoming deionized before full recovery is effected. Additionally, since the hold-off voltage of a gap discharge device is dependent upon the dielectric strength of the gas therein, gaseous gaps are often quite large when designed for use at high voltages.

Perhaps the greatest disadvantage of gaseous gap discharge devices, however, is due to the fact that with use, gas is removed or "cleaned-up" from the device by entrapment with deposited metallic particles which are sputtered from the electrodes of the gap. This "clean-up" changes the characteristic of the gap so that it does not perform reproducibly and the device must often be replaced long before actual failure.

Vacuum gap discharge devices have been proposed as a means to overcome many of these disadvantages. In theory, a vacuum gap discharge device would be smaller, due to the high dielectric strength of a vacuum; its recovery time would be much shorter; and, since there is no gas to be removed by sputtered metallic particles, a vacuum gap should not change its operating characteristics. In practice, however, prior art vacuum gap discharge devices have not proven to be reliable, either as to firing voltage, hold-off strength, or recovery time. In prior art vacuum spark gap devices, the operating characteristics seem to be a function of the device's past history, such as the time lapse since last firing.

In my co-pending application, Serial Number 109,089, filed May 10, 1961, now Patent No. 3,087,092, and assigned to the assignee of the present application, there is disclosed a triggered vacuum discharge device which comprises a pair of primary discharge electrodes, fabricated from gas-free metal, separated by a gap and disposed in an envelope evacuated to a pressure of $10^{-5}$ millimeters (mm.) of mercury or less. A trigger device, composed of gas-charged metal and having a trigger gap across which a discharge is easily started, is provided to release gas ions from the metal and direct them into the primary gap between the primary discharge electrodes so that the primary gap can be broken down by imposition of a high voltage across the primary electrodes. When the primary discharge is terminated, the primary gap clears quickly due to diffusion of the electrode material and due to gettering of the gas by the trigger metal so that the high dielectric strength of the original evacuated gap is reestablished rapidly. Until the trigger discharge is initiated again, the primary gap withstands very high voltages without breakdown. The response time for such a device is the time between initiation of the trigger pulse and breakdown of the primary gap. The recovery time is the time between termination of a primary discharge and the time when the primary gap is sufficiently cleared to withstand its rated voltage.

An object of the present invention is the provision of an improved trigger device for decreasing the response time of a triggered vacuum discharge device.

A further object of the present invention is the provision of an improved triggered vacuum discharge device having an extended period of use.

Another object of the present invention is the provision of an improved triggered vacuum discharge device having a low inductance value.

It is another object of the present invention to provide a high-speed triggered vacuum discharge device which is adapted to carry large currents during an extended period of use.

Briefly, in accordance with one feature of the present invention, an evacuated envelope encloses a pair of concentric coplanar primary electrodes which define an annular primary gap. Coaxially mounted in a compact arrangement and forming part of the boundary of the envelope are a pair of terminal connectors and a ceramic insulating disk therebetween. Shield means may be provided to protect the ceramic insulating disk from becoming coated and shorting the device during use, and magnetic means may be provided to rotate the primary discharge around the gap to decrease the amount of erosion.

In accord with another feature of the invention, a trigger device is provided which comprises means for injecting ionized gas into the gap to enable initiation of a discharge. The trigger device, which may be located at any position near the gap, for example in one primary electrode, comprises a pair of elongated concentric trigger electrodes between which a triggering arc is struck and magnetically impelled toward the primary gap. At least one of the trigger electrodes is composed of a material which liberates gas during the trigger discharge.

The novel features believed characteristic of the invention are set forth in the appended claims. The invention itself, together with further objects and advantages thereof, may best be understood by reference to the following description taken in connection with the appended drawings in which:

FIGURE 3 is a vertical cross-sectional view of an alternative embodiment of the present invention; and FIGURE 4 is a vertical cross-sectional view of the triggering means used in the discharge device of the present invention.

Figure 1:
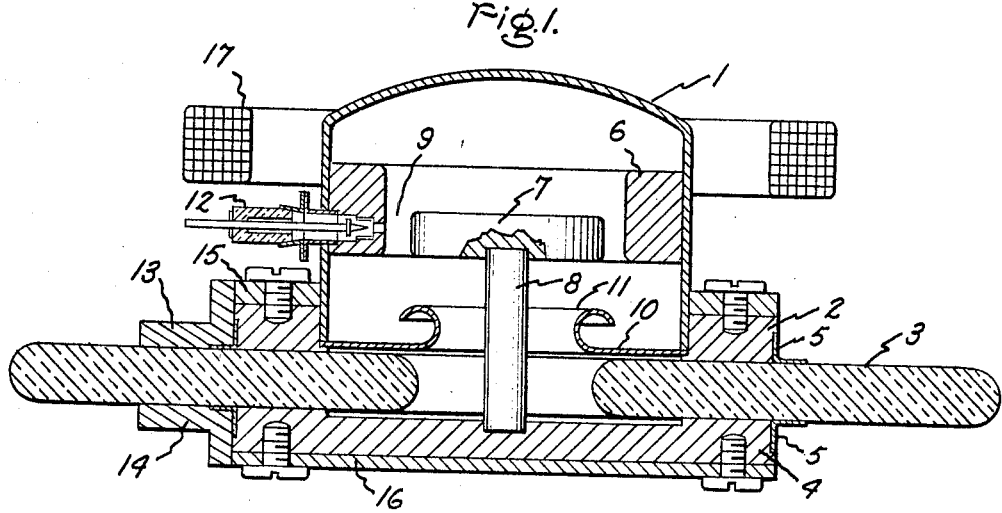
FIGURE 1 is a vertical cross-sectional view of the triggered vacuum discharge device of the present invention.

In FIGURE 1, the illustrated vacuum discharge device includes an evacuated metallic envelope 1, terminal connector ring 2, insulating disk 3, and terminal connector disk 4, all of which are appropriately sealed together. Ring members 5 insure proper metal-to-ceramic seals. Primary discharge electrodes 6 and 7, comprising respectively a ring and a disk, are supported in concentric, coplanar relationship within envelope 1, the electrical input path and the support for electrode 6 being provided by envelope 1, while terminal connector disk 4 supports and provides an electrical input path for electrode 7 through metallic support rod 8. The facing surfaces of primary electrodes 6 and 7 define annular primary gap 9. The longitudinal dimension of electrode 6 is greater than that of electrode 7 so as to preclude the possibility of the arc being directed to envelope 1. Shield 10, comprising a disk with a circular opening in its center and with the edges 11 of the opening curved back, protects the ceramic insulating disk 3 from eroded electrode material which might otherwise collect on the disk and cause a short circuit in the device. The ratio of the diameters of support rod 8 and the innermost portion of annular flange 11 is approximately $1/e$ in order to achieve a minimum electric field at the surface of rod 8.

Electrodes 6 and 7 are preferably composed of gas-free metal, for example copper which is substantially free of all gaseous impurities or impurities which, upon decomposition, may produce gases. In order to maintain a pressure of $10^{-5}$ mm. of mercury or less, electrodes 6 and 7 may be fabricated from copper of such high purity as to pass the following test: The electrode is placed in a vacuumized test chamber having a volume of few liters, and is subsequently deeply eroded by repetitive arcing, for example, by a voltage of commercial power and a current of 100 amperes or more. The copper is of the proper purity if the pressure level in the container, a few cycles after arcing, does not rise substantially from its initial value, in the absence of getters and pumps, even when the initial value is $10^{-5}$ mm. of mercury or less. Analytically, the requirement may be stated by the relationship that the contact material must contain less than $10^{-7}$ atomic parts of all gases.

Ceramic insulating disk 3 may be fabricated from any gas-impervious non-conducting material which may be hermetically sealed to a metal electrode. Generally, a gas-impervious ceramic may be utilized such as Coors V200 or American Lava T164. Alternatively, aluminum oxide or forsterite ceramic bodies may be used. It is to be understood, however, that although materials have been specifically enumerated, any gas-impervious ceramic or glass which may be hermetically sealed to metal members may also be utilized.

Trigger device or means 12, located in primary electrode 6, comprises any suitable means for injecting an ionized gas into the primary gap 9. For example, this device could be comprised of means for initiating a gas-liberating trigger discharge.

During operation of the triggered vacuum discharge device, the envelope 1 is evacuated to the desired degree. Under this condition, extremely high voltage, for example 3 to 100 kilovolts, may be applied to the primary electrodes 6 and 7 through the terminal connectors 2 and 4 without breakdown occurring across primary gap 9. When it is desired to initiate a breakdown, trigger device 12 is operated to inject an appropriate quantity of ionized gas into the primary gap 9, thereby enabling breakdown rapidly ensues and the device performs its intended function.

The primary discharge continues until the applied voltage decreases to a level, substantially zero, at which the discharge can no longer be maintained. When the discharge ends, the ionized gas may be quickly removed from the gap 9 by means provided in the trigger device 12 and ions eroded from the primary electrodes quickly diffuse to the walls of envelope 1, to the shield 10 and to the surfaces of the primary electrodes. Thus, the gap very quickly regains the high dielectric strength of a vacuum and is again able to withstand an extremely high voltage buildup without breakdown.

During the above-described operation, the compact arrangement of connectors 2 and 4 and disk 3 becomes important. Following initiation of the primary discharge, the current through the primary gap must reach its maximum value quickly or the high speed of operation permitted by the triggered vacuum discharge arrangement will be lost. If the conductors leading to the device present a high inductance, the current increase will be impeded and slow operation will result. Connectors 2 and 4 and disk 3 are arranged to avoid this difficulty. Input leads 13 and 14, electrically connected to connectors 2 and 4 through ring 15 and 16, respectively, set up magnetic fields represented by the well-known circular flux lines. These fields, in the region exterior to the leads, tend to cancel due to the oppositely directed current flow. Thus, placing leads 13 and 14 closely adjacent causes a large portion of the magnetic field coupling field coupling between them to cancel, thereby reducing the inductance of the system. This is more clearly illustrated in FIGURE 2.

Figure 2:
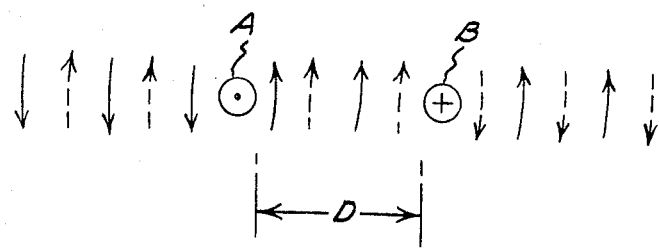
FIGURE 2 is a schematic diagram of the input leads to the discharge device of the present invention.

In FIGURE 2, two conductors A and B, corresponding to leads 13 and 14, are shown separated by the distance D. The flux lines due to current in wire A are represented by solid curved line elements while the flux lines due to current in wire B are represented by dotted curved line elements. It can be seen that, although the field between the conductors reinforces, the field external to a circle enclosing the conductors tends to cancel since the two fields are in opposing directions. Therefore, since the total inductance of the system is determined by the total flux, decreasing the distance D decreases the total flux and therefore decreases the total inductance.

With regard to FIGURE 1, the total inductance is maintained at a minimum by making the insulating disk 3 as thin as possible so that the connectors 2 and 4 and their associated conductors are placed as closely as possible.

If the primary discharge between electrodes 6 and 7 is allowed to remain in one position on the electrodes, localized heating and erosion caused by the arc will adversely affect the surfaces of the electrodes and will greatly decrease the useful life of the device. Furthermore, increased heating produces greater vapor present after current zero which results in the presence of more ionizable particles which could result in reignition on reversal of the A.C. voltage. For purposes of avoiding these disadvantages, solenoid 17 may be provided adjacent the envelope 1 to set up an appropriate magnetic field which interacts with the current of the discharge to create a force always having a component tangential to the gap-defining surfaces of the primary electrodes 6 and 7. Thus, the primary discharge rotates around the annular gap, decreasing local heating and erosion and also decreasing the recovery time of the device.

Alternatively, vertical slots in the electrodes 6 and 7 extending, for a substantial portion of their length, in a direction tangential to the gap-defining surface of the electrode may be used to give the current direction a tangential component, thereby enabling the magnetic field generated by the arc current loop to exert a tangential force on the discharge, causing it to rotate. Generally, any suitable means may be used for rotating the primary discharge to increase the useful electrode life and shorten the recovery time.

The shield 10 embodies a further advantage of the present invention in that the possibility of leakage due to collected eroded material is eliminated. The eroded material which diffuses to the walls of the device is prevented from reaching the ceramic disk and cannot collect sufficiently to form a bridge between the different potential points. Curved portion 11 avoids the juxtaposition of the end of shield 10 and support 8 which could otherwise cause an undesired arc. As is set forth hereinbefore the ratio of the diameter of rod 8 and the orifice by flange 11 is chosen to minimize such an occurrence.

An alternative embodiment of the present invention is shown in FIGURE 3. The device shown is identical to that of FIGURE 1 except for the location of trigger device 12. Since it is only necessary that the trigger device 12 be located to inject a plasma of charged particles into primary gap 9, it may be placed in envelope 1, electrode 6 or in any appropriate position, providing however it is positioned so as not to interfere with or be affected by the main arc.

In FIGURE 4, the trigger device 12 of the present invention is shown in greater detail. Although the trigger device is shown mounted in the body of primary electrode 6, any position within the device where the plasma generated by the trigger means will be injected into the primary gap 9 is acceptable, for example, the position illustrated in FIGURE 3. The trigger device of FIGURE 4 comprises an elongated rod-shaped trigger electrode 18 and a concentric inwardly tapered trigger electrode 19 which together at the innermost end thereof define a constricted trigger gap 20. Rod electrode 18 is supported by terminal lead 21 which also serves to connect electrode 18 to an appropriate source of trigger potential. The other pole of the trigger potential source is connected through primary electrode 6 and annular metallic member 22 to tapered cylindrical electrode 19. Tapered cylindrical electrode 19 is composed of, for example, titanium, zirconium, hafnium or thorium or any other gettering metal having an active gas absorbed therein. Rod electrode 18 may also be so composed, either in addition to or in place of electrode 19. Terminal lead 21 is supported within primary electrode 6 by ceramic insulator 23. Appropriate seals are used at requisite intersections and sealing member 25 seals the junction between ceramic insulator 23 and terminal lead 21.

When it is desired to enable the primary discharge to take place, the trigger potential source supplies an appropriate pulse between primary electrode 6 and terminal lead 21. In order to create conditions most favorable to a field emission breakdown between elements 18 and 19 at the trigger gap 20, they are preferably designed to optimize such a condition. Thus, rod electrode is made in such a small diameter as possible without sacrificing mechanical strength, and the innermost diameter of tapered electrode 19 is made as small as possible to make the trigger gap as small as possible. Typical dimensions for these elements are a rod electrode 18 diameter of 0.10" and a diameter at the innermost end of tapered electrode 19 of 0.050", with a resultant annular gap of approximately 0.020". For this configuration in vacuo, it is found that the potential difference at the gap is approximately 50 times the applied voltage. Thus, a pulse of 10 kv. results in a breakdown voltage of approximately 500 kv. across gap 20. Preferably rod electrode 18 is pulsed negative and a cathode spot is formed thereon and as trigger arc 26 is propagated to the main gap the cathode spot is readily transferred to main electrode 6. A trigger discharge is started upon application of the trigger potential. Due to the location of the trigger gap, the trigger discharge starts within tapered cylindrical electrode 19 and the flow of current through tapered cylindrical electrode 19, the trigger discharge arc and rod electrode 18 forms a closed current loop. Therefore, self-generated magnetic forces act on the trigger discharge to blow it along the portion of rod electrode 18 which extends into the primary gap 9. Under the eroding effect of the trigger discharge, the hydrogen absorbed in trigger electrode 19 is liberated and ionized and carried by the magnetic forces into the primary gap 9. When sufficient plasma has entered the prigary gap, the electric field across primary electrodes 6 and 7 causes a breakdown and the primary discharge is initiated. During the primary discharge, the trigger discharge is terminated to avoid charging the primary gap after the primary discharge has been terminated.

The specific embodiments described herein are presented merely as examples of the various forms the practice of this invention may take. Therefore, it is intended in the appended claims to cover all modifications and variations which come within the true spirit and scope of this invention.

What is claimed as new and desired to be secured by Letters Patent of the United States is:

1. A low inductance triggered vacuum discharge device comprising:
   (a) an evacuated, hermetically sealed envelope;
   (b) primary discharge means lying within said envelope comprising concentric, coplanar primary discharge electrodes wherein the innermost of said electrodes is completely enclosed within the volume defined by the outermost of said electrodes and defining a primary gap therebetween, said electrodes comprising,
      (c1) a ring electrode, and
      (c2) a disc electrode positioned completely within said ring electrode;
   (c) terminal connectors mounted outside said envelope and electrically connected to said electrodes;
   (d) trigger means positioned adjacent said primary gap for injecting charged particles into said primary gap; and
   (e) means for applying a voltage to said primary electrodes for initiating a discharge therebetween upon injection of said charged particles.

2. The triggered vacuum discharge device of claim 1 including:
   (a) an annular ceramic insulating disk separating said connectors, located within said evacuated envelope to provide an open evacuated space for the passage of a terminal lead from the innermost of said electrodes through the portions of said device having the same electrical potential as the outermost of said electrodes.

3. The triggered vacuum discharge device of claim 2 including:
   (a) shield means positioned between said primary gap and said ceramic disk for collecting material eroded from said primary electrodes, said shield being in the form of an annular plate with a ferruled aperture therein, said aperture having a diameter having an approximate ratio of $e$ to the diameter of a terminal rod electrically connected to the innermost of said electrodes and passing concentrically through said aperture.

4. The device of claim 1 wherein said trigger means is positioned in one of said electrodes for injecting charged particles into said primary gap.

5. The device of claim 4 wherein said trigger device comprises:
   (a) trigger surfaces defining a constricted trigger gap therebetween;
   (b) one of said trigger surfaces being composed of a metal having an active gas absorbing characteristic; and
   (c) means for applying a trigger pulse to said trigger surfaces for releasing ionized particles therefrom.

(References on following page)

References Cited by the Examiner

UNITED STATES PATENTS

| | | | |
|---|---|---|---|
| 1,314,152 | 8/1919 | Schmidt | 313—243 |
| 2,677,771 | 5/1954 | Turner | 315—111 |
| 3,090,852 | 5/1963 | Greenwood | 313—180 |
| 3,093,767 | 6/1963 | Lafferty | 313—180 |
| 3,151,274 | 9/1964 | Shell | 315—66 |
| 3,153,175 | 10/1964 | Winzeler | 315—111 |
| 3,184,634 | 5/1965 | Kershaw | 315—36 |

JAMES W. LAWRENCE, *Primary Examiner.*

GEORGE N. WESTBY, *Examiner.*

S. SCHLOSSER, *Assistant Examiner.*